(12) United States Patent
Sugiyama

(10) Patent No.: US 10,261,349 B2
(45) Date of Patent: Apr. 16, 2019

(54) OPTICAL MODULE

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/934,579

(22) Filed: Nov. 6, 2015

(65) Prior Publication Data

US 2016/0216539 A1 Jul. 28, 2016

(30) Foreign Application Priority Data

Jan. 28, 2015 (JP) .................................. 2015-014285

(51) Int. Cl.
| | |
|---|---|
| G02F 1/035 | (2006.01) |
| G02B 6/12 | (2006.01) |
| G02B 6/00 | (2006.01) |
| G02F 1/03 | (2006.01) |
| G02F 1/225 | (2006.01) |
| G02F 1/21 | (2006.01) |

(52) U.S. Cl.
CPC ............ *G02F 1/0316* (2013.01); *G02F 1/035* (2013.01); *G02F 1/225* (2013.01); *G02F 2001/212* (2013.01)

(58) Field of Classification Search
CPC .. G02B 6/4261; G02B 6/4246; G02B 6/3849; G02F 1/0316; G02F 1/035; G02F 1/225; G02F 1/33305; G02F 2001/212; G02F 2001/13629

USPC .............. 385/53–56, 75, 88, 89, 92, 93, 139
See application file for complete search history.

(56) References Cited

U.S. PATENT DOCUMENTS

| | | | |
|---|---|---|---|
| 2006/0140554 A1* | 6/2006 | Oki ...................... | G02B 6/4201 385/92 |
| 2006/0263013 A1 | 11/2006 | Sone | |
| 2009/0211801 A1* | 8/2009 | Edwards .............. | H05K 9/0058 174/377 |
| 2013/0156441 A1* | 6/2013 | Kunii ..................... | H04B 10/40 398/135 |

FOREIGN PATENT DOCUMENTS

| | | |
|---|---|---|
| JP | 2006-332648 | 12/2006 |
| JP | 2011-091295 | 5/2011 |
| JP | 2014-045091 | 3/2014 |

* cited by examiner

*Primary Examiner* — Kaveh C. Kianni
*Assistant Examiner* — Hung Lam
(74) *Attorney, Agent, or Firm* — Staas & Halsey LLP

(57) ABSTRACT

An optical module includes a substrate and terminals. The substrate has: a first planar part having first through holes into which the terminals are inserted respectively; a second planar part that opposes the first planar part as a result of the substrate being folded and has second through holes into which the terminals are inserted respectively; at least one first land part that is formed on the first planar part around at least one of the first through holes and that is connected to at least one of the terminals inserted through the first through hole; and at least one second land part that is formed on the second planar part around at least one of the second through holes into which another one of the terminals not being connected to the first land part is inserted and that is connected to the terminal inserted through the second through hole.

9 Claims, 15 Drawing Sheets

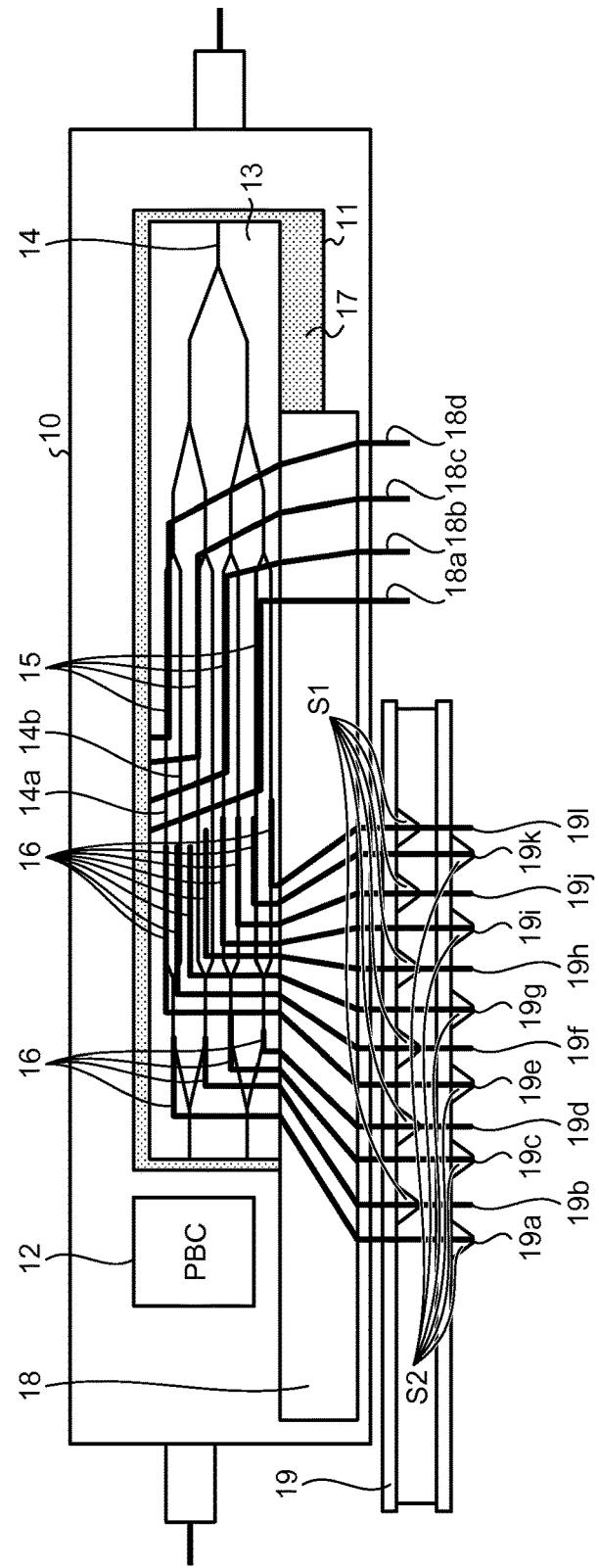

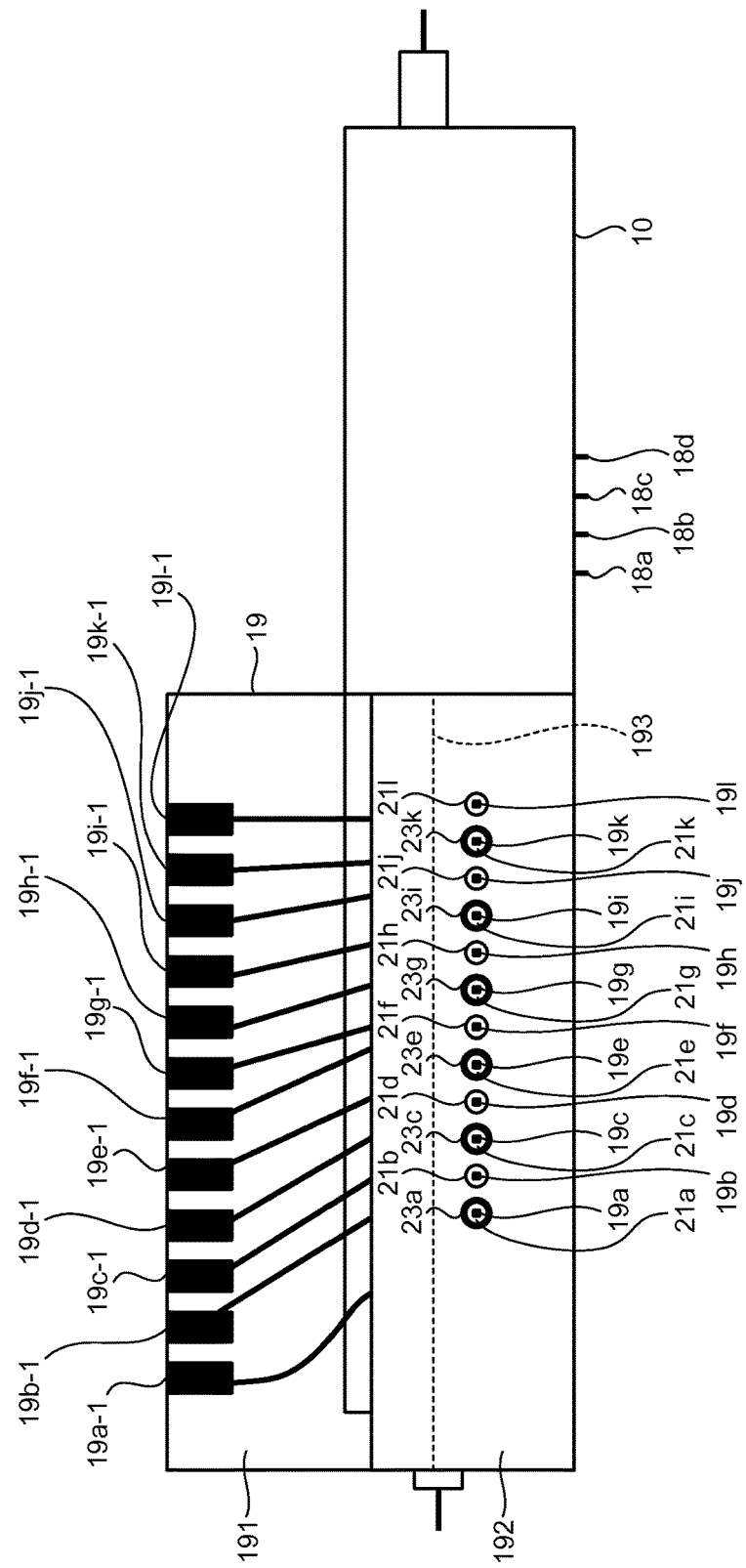

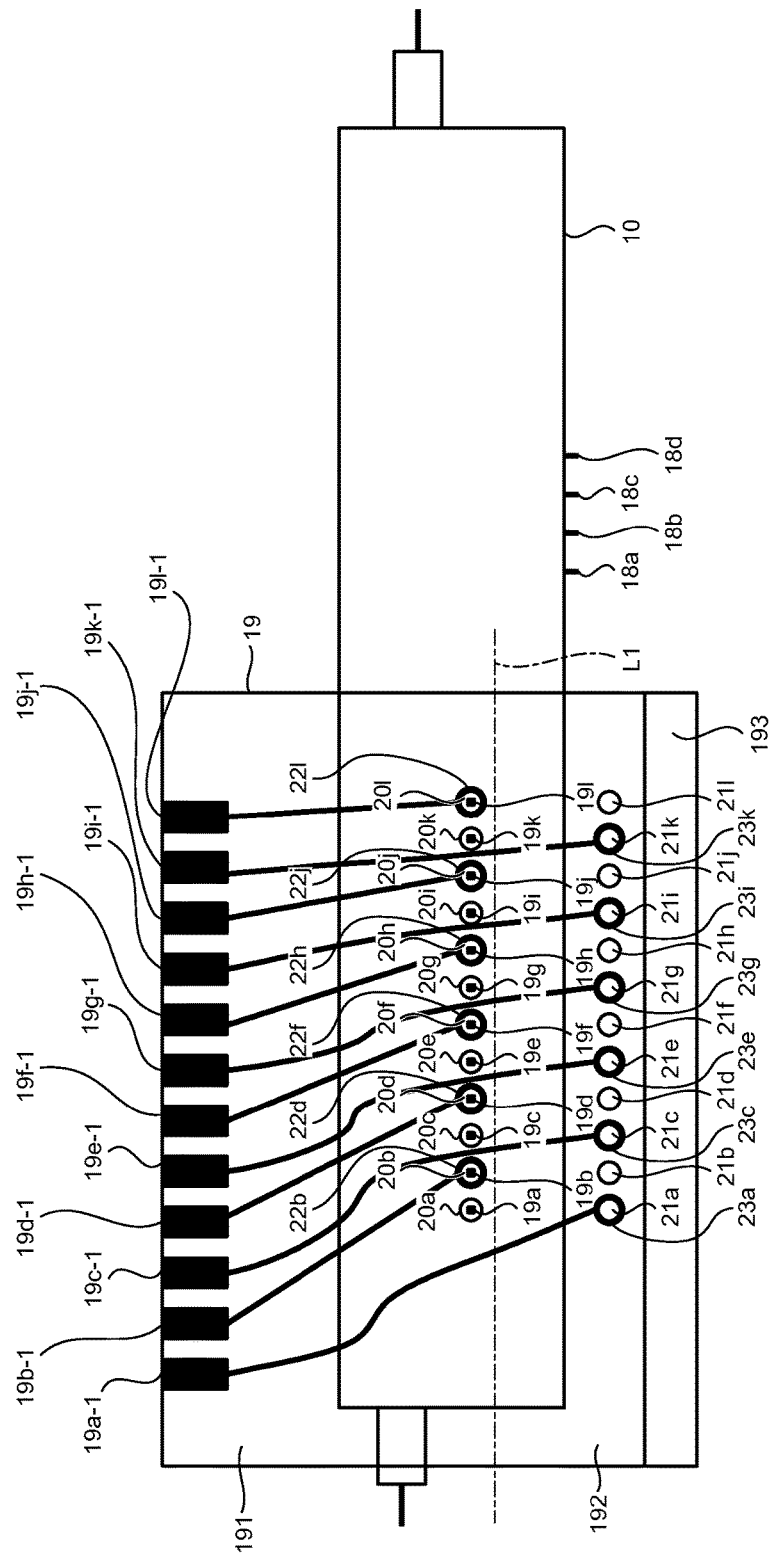

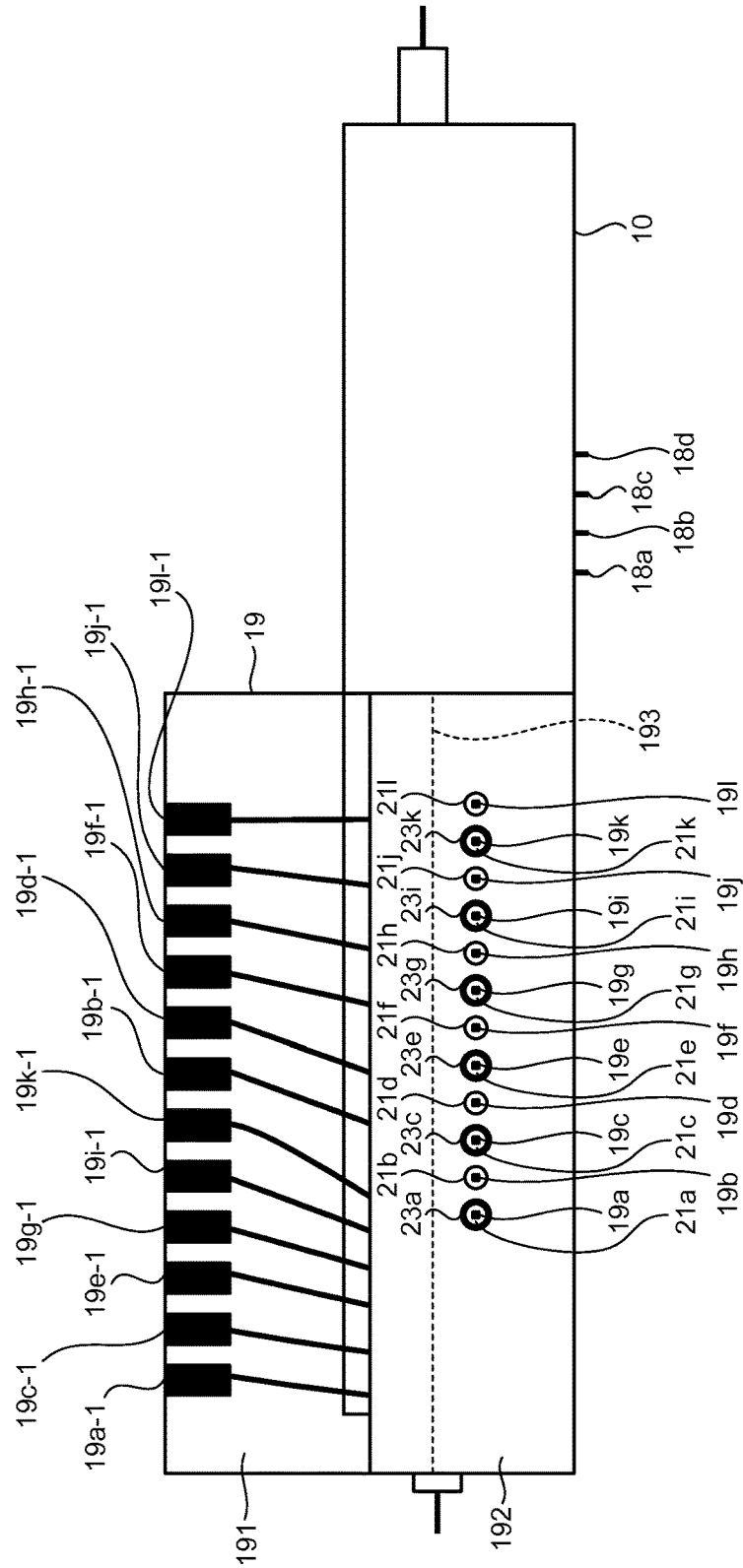

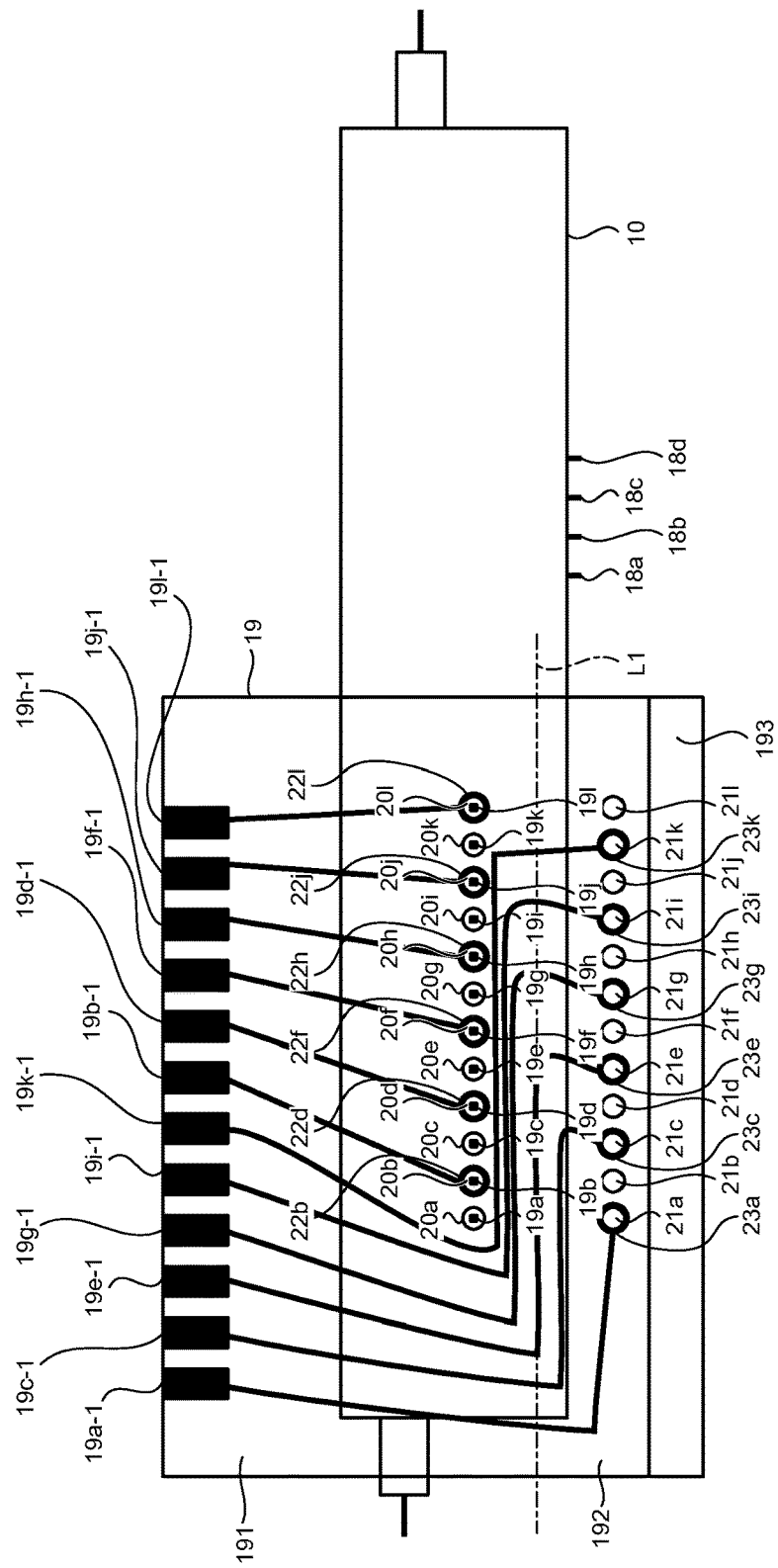

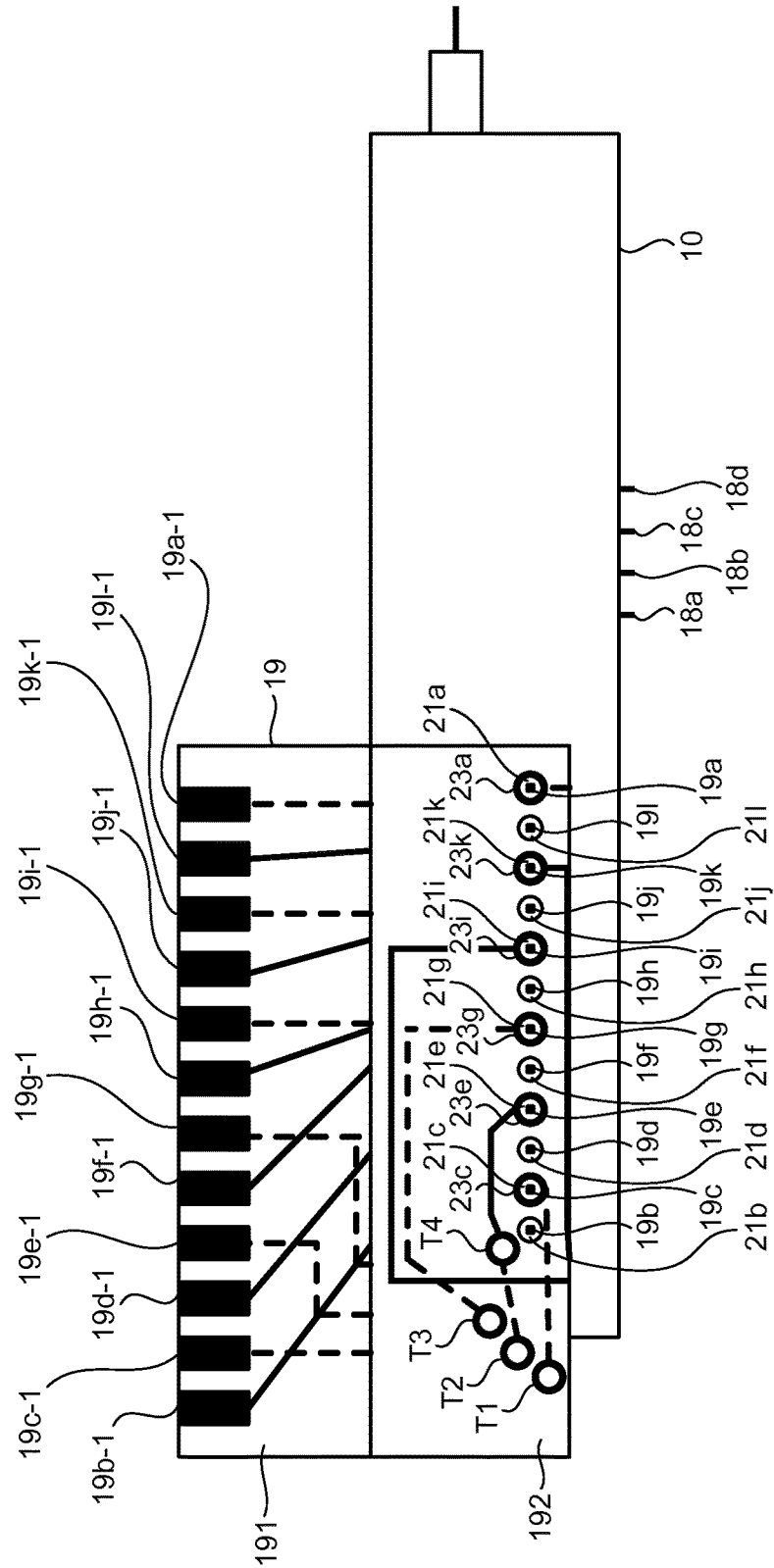

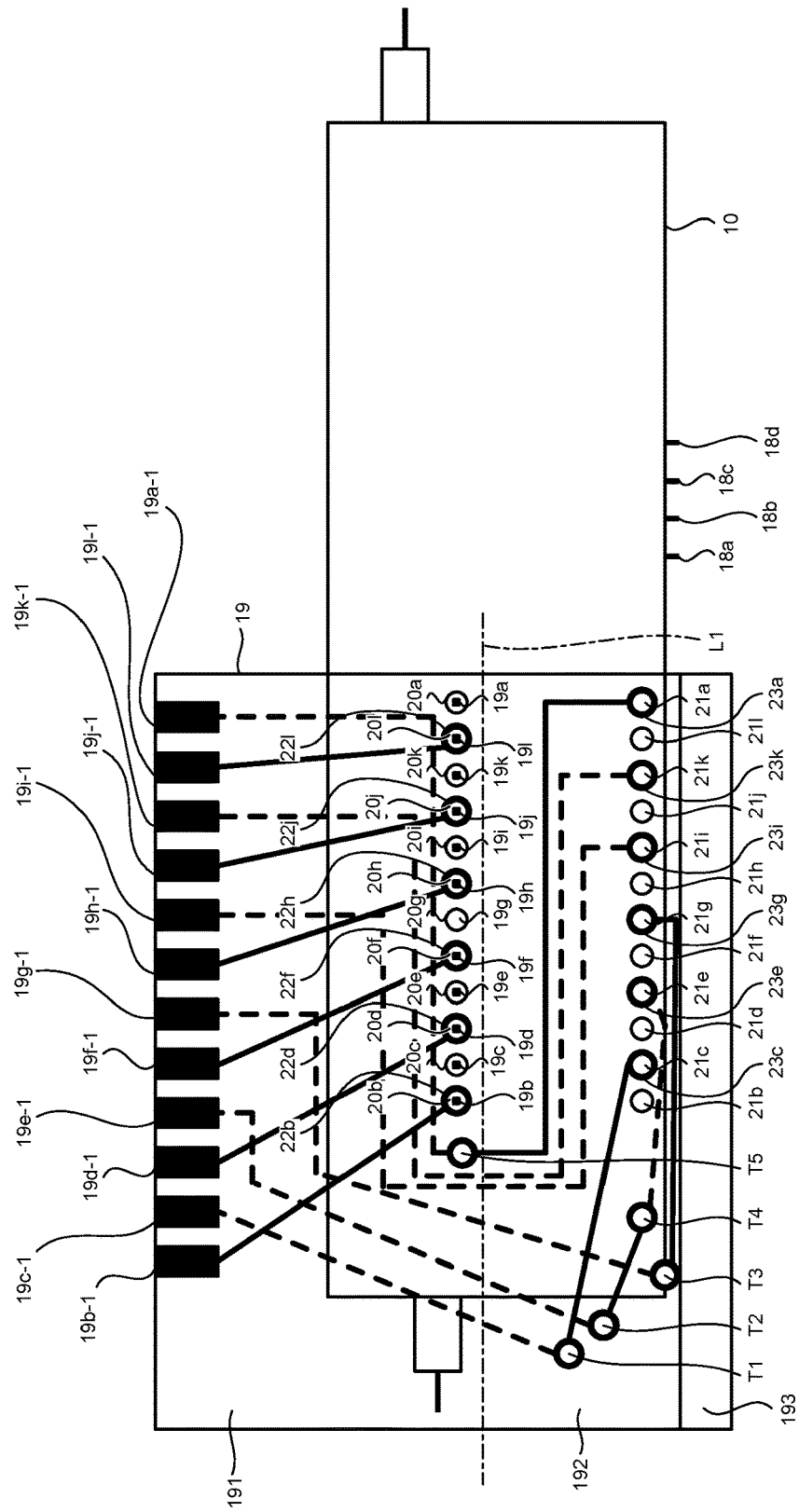

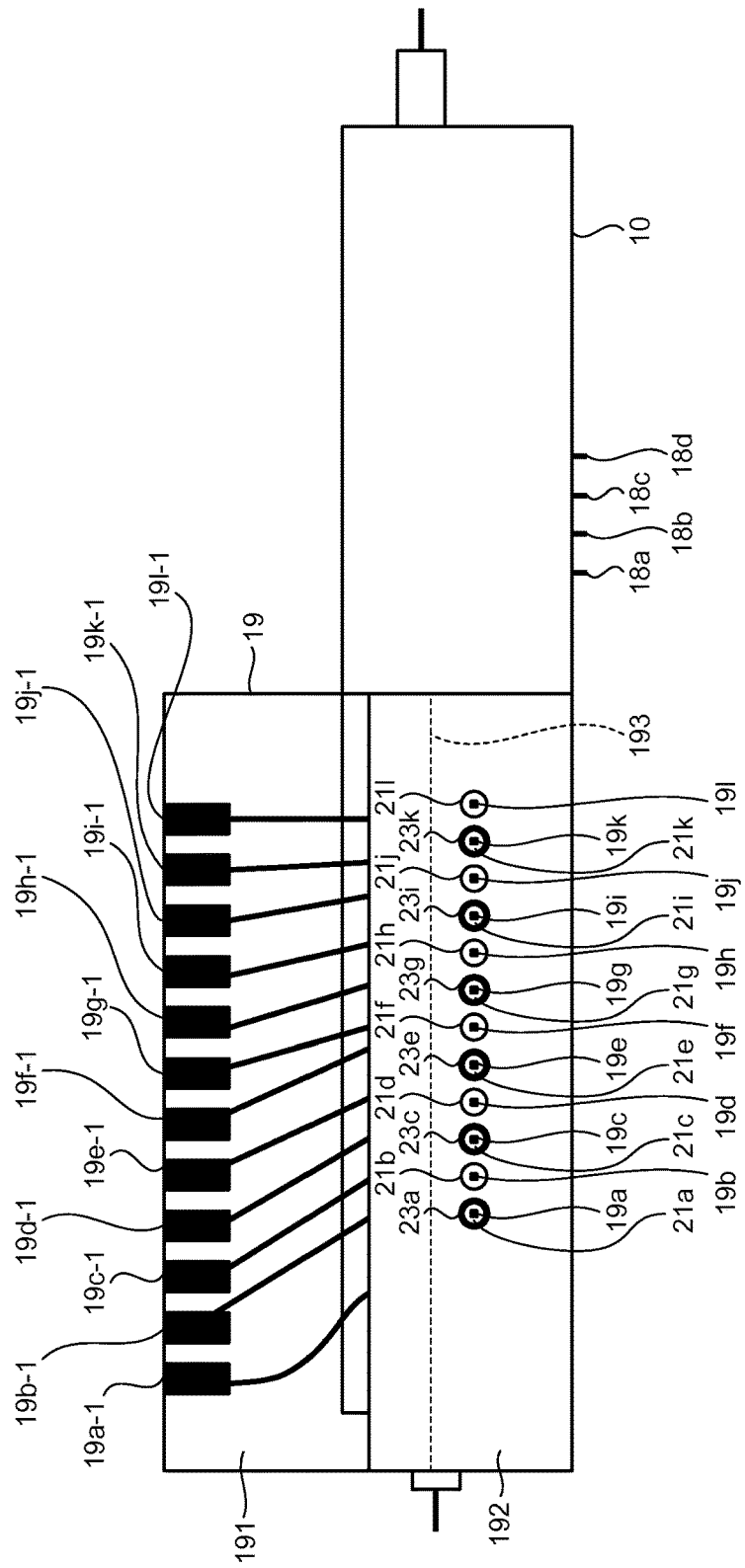

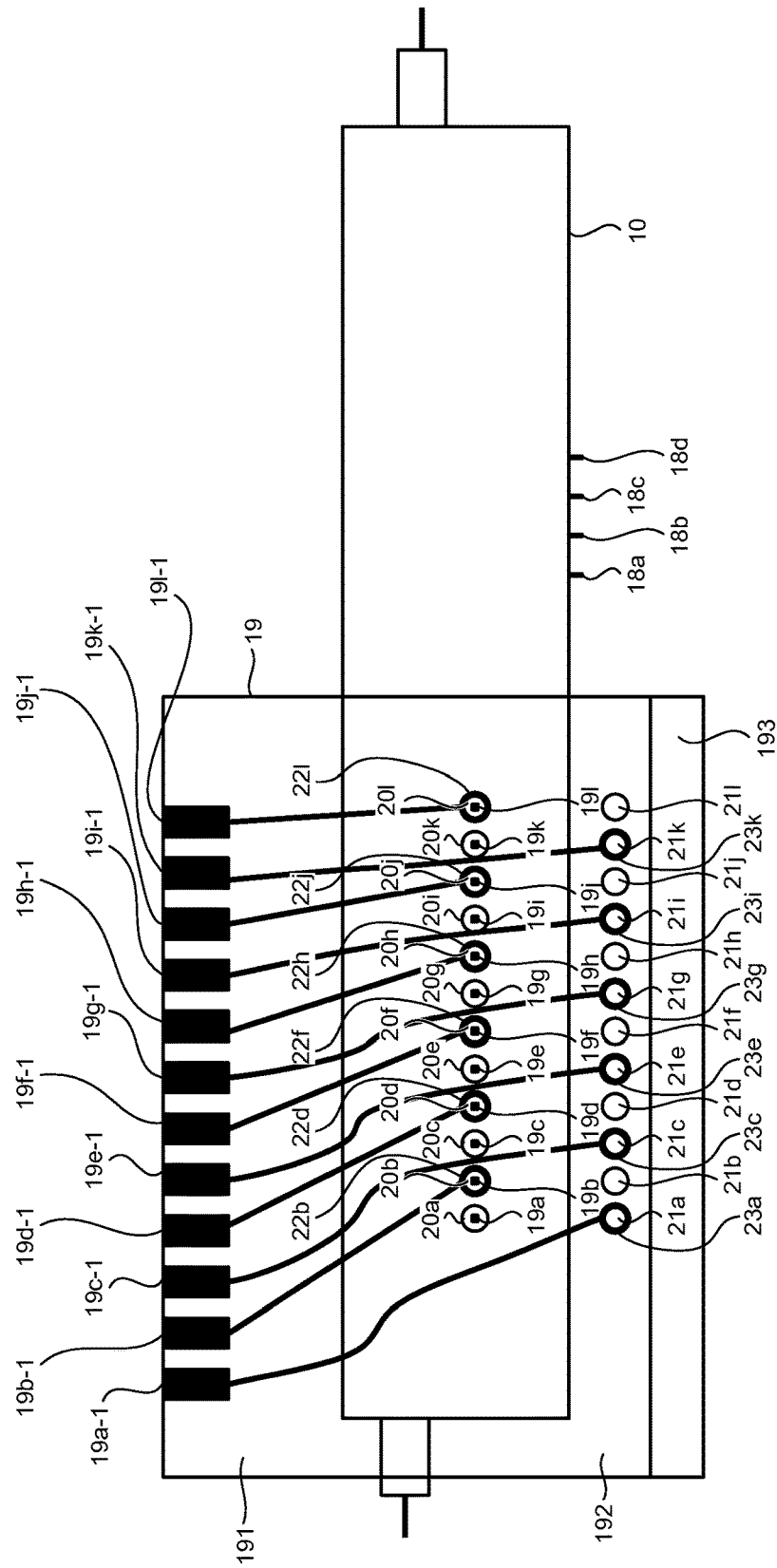

OPTICAL MODULE

CROSS-REFERENCE TO RELATED APPLICATION

This application is based upon and claims the benefit of priority of the prior Japanese Patent Application No. 2015-014285, filed on Jan. 28, 2015, the entire contents of which are incorporated herein by reference.

FIELD

The embodiments discussed herein are directed to an optical module.

BACKGROUND

In recent years, as optical transfer systems have become larger in scale, efforts are exerted to miniaturize optical modules structuring those systems. An optical module includes an optical modulator chip and an electrical interface. As the optical modulator chip becomes more compact, the size of the electrical interface becomes a factor that determines the size of the optical module. Elements of the electrical interface can be divided into Radio Frequency (RF) pins connected to RF electrodes for high-speed signals and Direct Current (DC) pins connected to DC electrodes for controlling the optical modulator chip. In other words, RF signals are input from the RF pins provided on a lateral face or a bottom face of a package and are input to the RF electrodes of the optical modulator chip via a relay substrate. Similarly, DC signals are input from the DC pins provided on a lateral race or a bottom face of the package and are input to the DC electrodes of the optical modulator chip via a relay substrate.

As for the electrical interface, four streams of signals at 32 Gbps are input to the RF pins. Thus, the package is provided with four RF pins. However, when the distances between the four RF pins are shortened to miniaturize the optical module, crosstalk between the RF pins (channels) increases. Accordingly, to miniaturize the electrical interface, it is important how much the distances between the DC pins can be shortened, while keeping the RF pins at such distances from one another that satisfy characteristic impedance.

For example, twelve DC pins are arranged in a row in the width direction on a Flexible Printed Circuit (FPC) provided for the package. In this arrangement where the DC pins are arranged in a row in the width direction on the FPC, however, when the DC pins are soldered to land parts formed around through holes into which the DC pins are inserted, there is a possibility that the land parts positioned adjacent to each other may have short-circuits caused by the solder.

To cope with this situation, a structure has been proposed in which an FPC is provided with cut-out parts formed in such areas thereof that are positioned between adjacently-positioned land parts, so that the FPC can be shaped in such a manner that the adjacently-positioned land parts are at mutually-different heights. By using this structure, it is possible to configure an optical module so that the DC pins are soldered to the corresponding land parts, while the adjacently-positioned land parts are apart from each other in the height direction. Consequently, it is possible to inhibit the occurrence of crosstalk between the DC pins.

CITATION LIST

Patent Literature

Patent Document 1: Japanese Laid-open Patent Publication No. 2014-45091
Patent Document 2: Japanese Laid-open Patent Publication No. 2006-332648

However, although the structure described above is able to inhibit the occurrence of crosstalk, the structure involves the process of shaping the FPC by using the cut-out parts, when the DC pins are soldered to the corresponding land parts. Consequently, the workability in the soldering process is degraded.

SUMMARY

According to an aspect of an embodiment, an optical module includes a substrate and a plurality of terminals. the substrate includes a first planar part having a plurality of first through holes into which the plurality of terminals are inserted respectively; a second planar part that opposes the first planar part as a result of the substrate being folded and that has a plurality of second through holes into which the plurality of terminals are inserted respectively; a first land part that is formed on the first planar part around at least one of the plurality of first through holes and that is connected to at least one of the plurality of terminals inserted into the at least one of the plurality of first through holes; and a second land part that is formed on the second planar part around at least one of the plurality of second through holes into which another one of the plurality of terminals not being connected to the first land part is inserted and that is connected to the other one of the plurality of terminals inserted into the at least one of the plurality of second through holes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a top view of an optical module according to an embodiment disclosed herein;
FIG. 1B is a side view illustrating an FPC in a folded state in the optical module according to the present embodiment;
FIG. 1D is a side view illustrating the FPC in an unfolded state in the optical module according to the present embodiment;
FIG. 2A is a side view illustrating the FPC in a folded state in the optical module according to a first modification example;
FIG. 2B is a side view illustrating the FPC in an unfolded state in the optical module according to the first modification example;
FIG. 3A is a side view illustrating the FPC in a folded state in the optical module according to a second modification example;

FIG. 3B is a side view illustrating the FPC in an unfolded state in the optical module according to the second modification example;

FIG. 5A is a side view illustrating the FPC in a folded state in the optical module according to a fourth modification example;

FIG. 5B is a side view illustrating the FPC in an unfolded state in the optical module according to the fourth modification example;

DESCRIPTION OF EMBODIMENTS

Figure 1C:
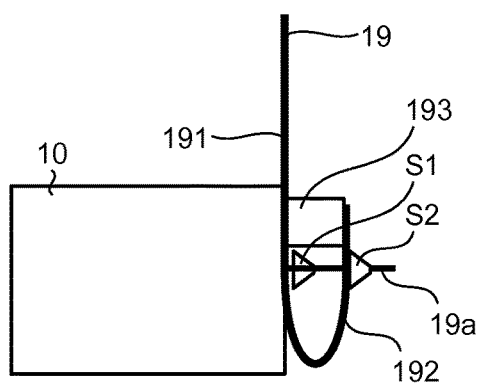
FIG. 1C is a front view of the optical module illustrated in FIG. 1B.

Preferred embodiments of the present invention will be explained with reference to accompanying drawings. Possible embodiments of the optical module disclosed herein are not limited to the embodiments described below.

First, a configuration of an optical module according to an embodiment disclosed herein will be explained. FIG. 1A is a top view of an optical module 10 according to the present embodiment. As illustrated in FIG. 1A, the optical module 10 includes a package 11 and a Polarization Beam Coupler (PBC) 12. In the package 11, electrodes 15 and 16 are provided near optical waveguides 14 formed on a crystal substrate 13. The crystal substrate 13 is formed with an electro-optic crystal of $LiNbO_3$ (LN), $LiTaO_2$, or the like. Further, the optical waveguides 14 are formed by forming and thermally diffusing a metal film of Ti or the like or by performing a patterning process followed by a proton exchange carried out in a benzoic acid. The optical waveguides 14 structure a Mach-Zehnder interferometer. The electrodes 15 and 16 are provided on Mach-Zehnder parallel waveguides.

Further, the electrodes 15 and 16 are positioned directly above the optical waveguides 14 to utilize a refractive index fluctuation caused by an electric field in a z-axis direction. The electrodes 15 and 16 are coplanar electrodes formed by patterning signal electrodes and ground electrodes on the optical waveguides 14. To prevent the light propagated through the optical waveguides 14 from being absorbed by the signal electrodes and the ground electrodes, the optical module 10 has a buffer layer provided between the crystal substrate 13 and the electrodes 15 and 16. The buffer layer is formed with $SiO_2$ or the like having a thickness of approximately 0.2 to 2 μm. The crystal substrate 13 may be formed by using a semiconductor in Group III, IV, or V, such as InP, GaAs, or the like.

When being driven at a high speed, the optical module 10 connects ends of the signal electrodes and the ground electrodes together to form traveling wave electrodes and applies a microwave signal thereto from the input side. In that situation, the refractive indices of two optical waveguides 14 (e.g., optical waveguides 14a and 14b) forming the Mach-Zehnder structure change due to the electric field so as to become $+\Delta na$ and $-\Delta nb$. Accordingly, the phase difference between the optical waveguides 14 changes. As a result, signal light of which the phase has been modulated due to a Mach-Zehnder interference is output from the optical waveguides 14. By controlling the effective refractive index of the microwave by changing the cross-sectional shapes of the electrodes 15 and 16, the optical module 10 is able to achieve high-speed optical response characteristics by matching the speeds of the light and the microwave with each other.

On the inside of the package 11 housing the crystal substrate 13, the optical waveguides 14, and the electrodes 15 and 16, a carrier 17 supports various types of component parts. The package 11 is provided with a Flexible Printed Circuit (FPC) 19 while a relay substrate 18 is interposed therebetween. When the electrodes on the FPC 19 have a large loss of radio-frequency propagation, the modulation band becomes narrower, and the driving voltage is raised. For this reason, for the optical module 10, which handles radio frequency signals, it is desirable to arrange the FPC 19 to be as short as possible in order to reduce the radio frequency loss.

As illustrated in FIG. 1A, the relay substrate 18 has four RF pins 18a to 18d connected to the electrodes 15, in a rear part of the input-side lateral face of the package 11. Further, the FPC 19 has twelve Direct Current (DC) pins 19a to 19l connected to the electrodes 16 in a front part of the input-side lateral face of the package 11.

Figure 1E:
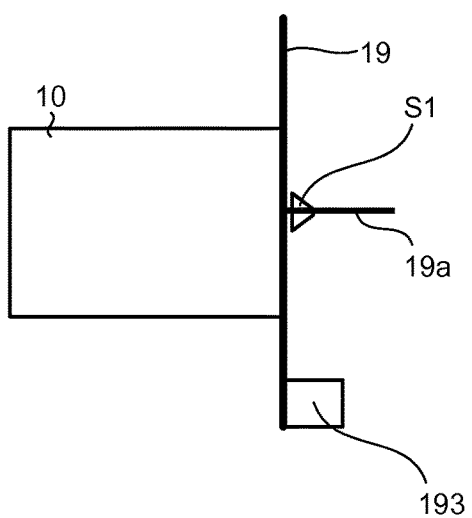
FIG. 1E is a front view of the optical module illustrated in FIG. 1D.

FIG. 1B is a side view illustrating the FPC 19 in a folded state in the optical module 10 according to the present embodiment. FIG. 1C is a front view of the optical module 10 illustrated in FIG. 1B. FIG. 1D is a side view illustrating the FPC 19 in an unfolded state in the optical module 10 according to the present embodiment. FIG. 1E is a front view of the optical module 10 illustrated in FIG. 1D.

As illustrated in FIGS. 1B and 1D, on the FPC 19, the twelve DC pins 19a to 19l are arranged in a row. Further, during the manufacture of the optical module 10, the FPC 19 is folded at a fold start line L1 indicated by a dashed line in FIG. 1D. As a result, the FPC 19 changes from the state illustrated in FIGS. 1D and 1E into the state illustrated in FIGS. 1B and 1C.

As illustrated in FIGS. 1B to 1E, the FPC 19 has a first planar part 191, a second planar part 192 that opposes the first planar part 191 as a result of the FPC 19 being folded, and a spacer 193. The first planar part 191 has formed therein first through holes 20a to 20l into which the DC pins 19a to 19l are inserted, respectively. The second planar part 192 has formed therein second through holes 21a to 21l into which the DC pins 19a to 19l that are inserted through the first through holes 20a to 20l are further inserted, respectively.

In the first planar part 191, first land parts 22b, 22d, 22f, 22h, 22j, and 22l are formed around selected ones of the first through holes 20a to 20l that are not positioned adjacent to each other, namely, the first through holes 20b, 20d, 20f, 20h, 20j, and 20l, respectively. The first land parts 22b, 22d, 22f, 22h, 22j, and 22l are connected to selected ones of the DC pins 19a to 19l, namely, the DC pins inserted through the first through holes 20b, 20d, 20f, 20h, 20j, and 20l. More specifically, the first land parts 22b, 22d, 22f, 22h, 22j, and 22l are electrically connected to the DC pins 19b, 19d, 19f, 19h, 19j, and 19l, respectively, by solder S1 (see FIG. 1). As a result, the first land parts 22b, 22d, 22f, 22h, 22j, and 22l are inhibited from having short-circuits therebetween that may be caused by the solder. In addition, it is also possible to easily solder each of the DC pins to the corresponding one of the first land parts 22b, 22d, 22f, 22h, 22j, and 22l.

In the second planar part 192, second land parts 23a, 23c, 23e, 23g, 23i, and 23k are formed around selected ones of the second through holes 21a to 21l into which the other pins are inserted, namely, around the second through holes 21a, 21c, 21e, 21g, 21i and 21k. In this situation, the other pins are the DC pins 19a, 19c, 19e, 19g, 19i, and 19k, which are among the DC pins 19a to 19l and are not connected to the first land parts 22b, 22d, 22f, 22h, 22j, and 22l. The second land parts 23a, 23c, 23e, 23g, 23i, and 23k are connected to the other DC pins, which are among the DC pins 19a to 19l and are inserted through the second through holes 21a, 21c, 21e, 21g, 21i, and 21k. More specifically, the second land parts 23a, 23c, 23e, 23g, 23i, and 23k are electrically connected to the DC pins 19a, 19c, 19e, 19g, 19i, and 19k, respectively, by solder S2 (see FIG. 1). As a result, the second land parts 23a, 23c, 23e, 23g, 23i, and 23k are inhibited from having short-circuits therebetween that may be caused by the solder. In addition, it is also possible to easily solder each of the DC pins to the corresponding one of the second land parts 23a, 23c, 23e, 23g, 23i, and 23k.

The wirings extending from the second land parts 23a, 23c, 23e, 23g, 23i, and 23k to DC electrodes 19a-1, 19c-1, 19e-1, 19g-1, 19i-1, and 19k-1, respectively, are formed so that the wirings are routed through the spaces positioned between the first land parts 22b, 22d, 22f, 22h, 22j, and 22l. As a result, it is possible to prevent the wirings connecting the second land parts to the DC electrodes 19a-1, 19c-1, 19e-1, 19g-1, 19i-1, and 19k-1 from intersecting the wirings connecting the first land parts to DC electrodes 19b-1, 19d-1, 19f-1, 19h-1, 19j-1, and 19l-1.

The spacer 193 is interposed between the first planar part 191 and the second planar part 192, while the second planar part 192 is opposing the first planar part 191 as a result of the FPC 19 being folded. During the manufacture of the optical module 10, the FPC 19 is folded at the fold start line L1 indicated by the dashed line in FIG. 1D. When being folded, the FPC 19 is folded in such a manner that the first planar part 191 and the second planar part 192 are positioned apart from each other by a distance corresponding to the thickness of the spacer 193. Accordingly, the stress applied to the folded section of the FPC 19 is smaller than in the situation where the spacer 193 is not interposed. As a result, it is possible to lower the possibility that the wirings connecting the second land parts 23a, 23c, 23e, 23g, 23i, and 23k to the DC electrodes 19a-1, 19c-1, 19e-1, 19g-1, 19i-1, and 19k-1 may be broken by the stress from folding the FPC 19. Further, it is possible to avoid the situation where the wirings connecting the second land parts 23a, 23c, 23e, 23g, 23i, and 23k connecting to the DC electrodes 19a-1, 19c-1, 19e-1, 19g-1, 19i-1, and 19k-1 come into contact with the first land parts 22b, 22d, 22f, 22h, 22j, and 22l.

As explained above, the optical module 10 includes the FPC 19 and the plurality of DC pins 19a to 19l. The FPC 19 includes the first planar part 191, the second planar part 192, the first land parts 22b and 22d, and the second land parts 23a and 23c. The first planar part 191 has formed therein the plurality of first through holes 20a to 20l into which the plurality of DC pins 19a to 19l are inserted, respectively. The second planar part 192 opposes the first planar part 191 as a result of the FPC 19 being folded and has formed therein the plurality of second through holes 21a to 21l into which the plurality of DC pins 19a to 19l are inserted, respectively. The first land parts 22b and 22d are formed on the first planar part 191 around the selected ones of the first through holes 20a to 20l, namely, the first through holes 20b and 20d. The first land parts 22b and 22d are connected to the selected DC pins 19b and 19d, respectively, which are among the plurality of DC pins 19a to 19l and are inserted through the selected first through holes 20b and 20d, respectively. The second land parts 23a and 23c are formed on the second planar part 192 around the selected second through holes 21a and 21c, respectively, which are among the second through holes 21a to 21l and into which other DC pins 19a and 19c not being connected to any of the first land parts are inserted, respectively. The second land parts 23a and 23c are connected to the other DC pins 19a and 19c that are inserted through the selected second through holes 21a and 21c, respectively.

As a result, it is possible to inhibit the occurrence of short-circuits between the land parts that may be caused by the solder. In addition, it is also possible to easily solder the DC pins to the corresponding land parts. Consequently, it is possible to inhibit the occurrence of crosstalk between the DC signals flowing through any adjacently-positioned two of the DC pins 19a to 19l. In addition, it is also possible to improve the workability in the process of soldering the DC pins to the corresponding land parts.

[a] First Modification Example

Next, a first modification example will be explained. An optical module according to the first modification example has the same configuration as that of the optical module 10 according to the embodiment described above, except for the wirings of the FPC 19. Accordingly, in the description of the first modification example, some of the constituent elements that are the same as those in the embodiment described above will be referred to by using the same reference characters, and the detailed explanation thereof will be omitted.

FIG. 2A is a side view illustrating the FPC 19 in a folded state in the optical module 10 according to the first modification example. FIG. 2B is a side view illustrating the FPC 19 in an unfolded state in the optical module 10 according to the first modification example.

As illustrated in FIGS. 2A and 2B, the wirings extending from the second land parts 23a, 23c, 23e, 23g, 23i, and 23k to the DC electrodes 19a-1, 19c-1, 19e-1, 19g-1, 19i-1 and 19k-1, respectively, are formed so as to detour the DC pin 19a positioned at the far left. In other words, in the optical module 10 according to the first modification example, the wirings are formed so as to detour the DC pin 19a arranged in the outermost position among the plurality of DC pins 19a to 19l inserted through the plurality of first through holes 20a to 20l, respectively. In this arrangement, the distances between the wirings and the first land parts 22b, 22d, 22f, 22h, 22j, and 22l are larger, compared to the example in which the wirings are routed through the spaces positioned between the first land parts 22b, 22d, 22f, 22h, 22j, and 22l. As a result, it is possible to prevent beforehand the occurrence of short-circuits between the wirings and the land parts.

Further, in the optical module 10 according to the first modification example, it is possible to reduce the spaces between the first land parts 22b, 22d, 22f, 22h, 22j, and 22l, which were used for introducing the wirings extending from the second land parts 23a, 23c, 23e, 23g, 23i, and 23k to the DC electrodes. Consequently, it is possible to eliminate the need to enlarge the gap between the first land parts 22b, 22d, 22*f*, 22*h*, 22*j*, and 22*l*, or the like. It is therefore possible to miniaturize the optical module 10.

[b] Second Modification Example

Next, a second modification example will be explained. An optical module according to the second modification example has the same configuration as that of the optical module 10 according to the embodiment described above, except for the wirings of the FPC 19. Accordingly, in the description of the second modification example, some of the constituent elements that are the same as those in the embodiment described above will be referred to by using the same reference characters, and the detailed explanation thereof will be omitted.

FIG. 3A is a side view illustrating the FPC 19 in a folded state in the optical module 10 according to the second modification example. FIG. 3B is a side view illustrating the FPC 19 in an unfolded state in the optical module 10 according to the second modification example. In FIG. 3B, the solid line in the FPC 19 indicates the wirings formed on the front surface of the FPC 19 before being folded, whereas the broken line in the FPC 19 indicates the wirings formed on the rear surface (the surface on the package 11 side) of the FPC 19 before being folded. Further, in FIG. 3A, the solid line in the first planar part 191 of the FPC 19 indicates the wirings formed on the front surface of the FPC 19 before being folded, whereas the broken line in the first planar part 191 indicates the wirings formed on the rear surface of the FPC 19 before being folded. Further, in FIG. 3A, the solid line in the second planar part 192 of the FPC 19 indicates the wirings formed on the rear surface of the FPC 19 before being folded, whereas the broken line in the second planar part 192 indicates the wirings formed on the front surface of the FPC 19 before being folded.

As illustrated in FIGS. 3A and 3B, the wirings extending from the second land parts 23*a*, 23*c*, 23*e*, 23*g*, 23*i*, and 23*k* to the DC electrodes 19*a*-1, 19*c*-1, 19*e*-1, 19*g*-1, 19*i*-1 and 19*k*-1, respectively, are formed so as to detour the DC pin 19*b* positioned at the far left. Further, the first land parts 22*b*, 22*d*, 22*f*, 22*h*, 22*j*, and 22*l* are connected to the DC electrodes 19*b*-1, 19*d*-1, 19*f*-1, 19*h*-1, 19*j*-1, and 19*l*-1, respectively, via the wirings formed on the front surface of the FPC 19 before being folded. In contrast, the second land parts 23*a*, 23*c*, 23*e*, 23*g*, 23*i*, and 23*k* are connected to the DC electrodes 19*a*-1, 19*c*-1, 19*e*-1, 19*g*-1, 19*i*-1, and 19*k*-1, respectively, via the wirings formed on the both surfaces of the FPC 19 before being folded. Further, only the wirings extending from the second land parts 23*c*, 23*g*, and 23*k*, which are among the second land parts 23*a*, 23*c*, 23*e*, 23*g*, 23*i*, and 23*k* and are not positioned adjacent to each other, are formed from the rear surface of the FPC 19 before being folded, so as to ensure that any two channels that are positioned adjacent to each other are arranged on the mutually-opposite surfaces of the FPC 19. With these arrangements, it is possible to enlarge the wiring gap between the adjacently-positioned second land parts, and it is therefore possible to reduce the crosstalk between the signals flowing through the wirings from the second land parts 23*a*, 23*c*, 23*e*, 23*g*, 23*i*, and 23*k*.

It is noted, however, that if all of the wirings connecting the second land parts 23*a*, 23*c*, 23*e*, 23*g*, 23*i*, and 23*k* to the DC electrodes 19*a*-1, 19*c*-1, 19*e*-1, 19*g*-1, 19*i*-1, and 19*k*-1 were formed on the rear surface of the FPC 19, the wirings would intersect one another on a left end part of the FPC 19. To cope with this situation, the FPC 19 has through holes T1 to T5 that connect the wirings formed on the front surface to the wirings formed on the rear surface, so that any of the wirings can be changed to the opposite surface, if appropriate. In the example illustrated in FIG. 3B, for instance, the wiring formed on the rear surface to extend from the second land part 23*e* is once arranged to run on the front surface via the through hole T4 and is then arranged to return to the rear surface via the through hole T2. In other words, in the optical module 10 according to the second modification example, the wiring formed on the rear surface to extend from the second land part 23*e* is arranged to run on the front surface and the rear surface of the FPC 19 alternately. With these arrangements, it is possible to avoid the situation where the wiring connecting the second land part 23*e* to the electrode 19*e*-1 intersects the wirings connecting the second land parts 23*g* and 23*i* respectively to the DC electrodes 19*g*-1 and 19*i*-1, on the rear surface of the FPC 19. As a result, it is possible to prevent beforehand the occurrence of short-circuits between the wirings. Further, as illustrated in FIGS. 3A and 3B, because the layout of the DC electrodes 19*a*-1 to 19*l*-1 coincides with the layout of the DC pins 19*a* to 19*l*, it is possible to maintain compatibility with the conventional layout of the DC electrodes.

[c] Third Modification Example

Next, a third modification example will be explained. An optical module according to the third modification example has the same configuration as that of the optical module 10 according to the embodiment described above, except that the FPC 19 has cut-out parts. Accordingly, in the description of the third modification example, some of the constituent elements that are the same as those in the embodiment described above will be referred to by using the same reference characters, and the detailed explanation thereof will be omitted.

Figure 4:
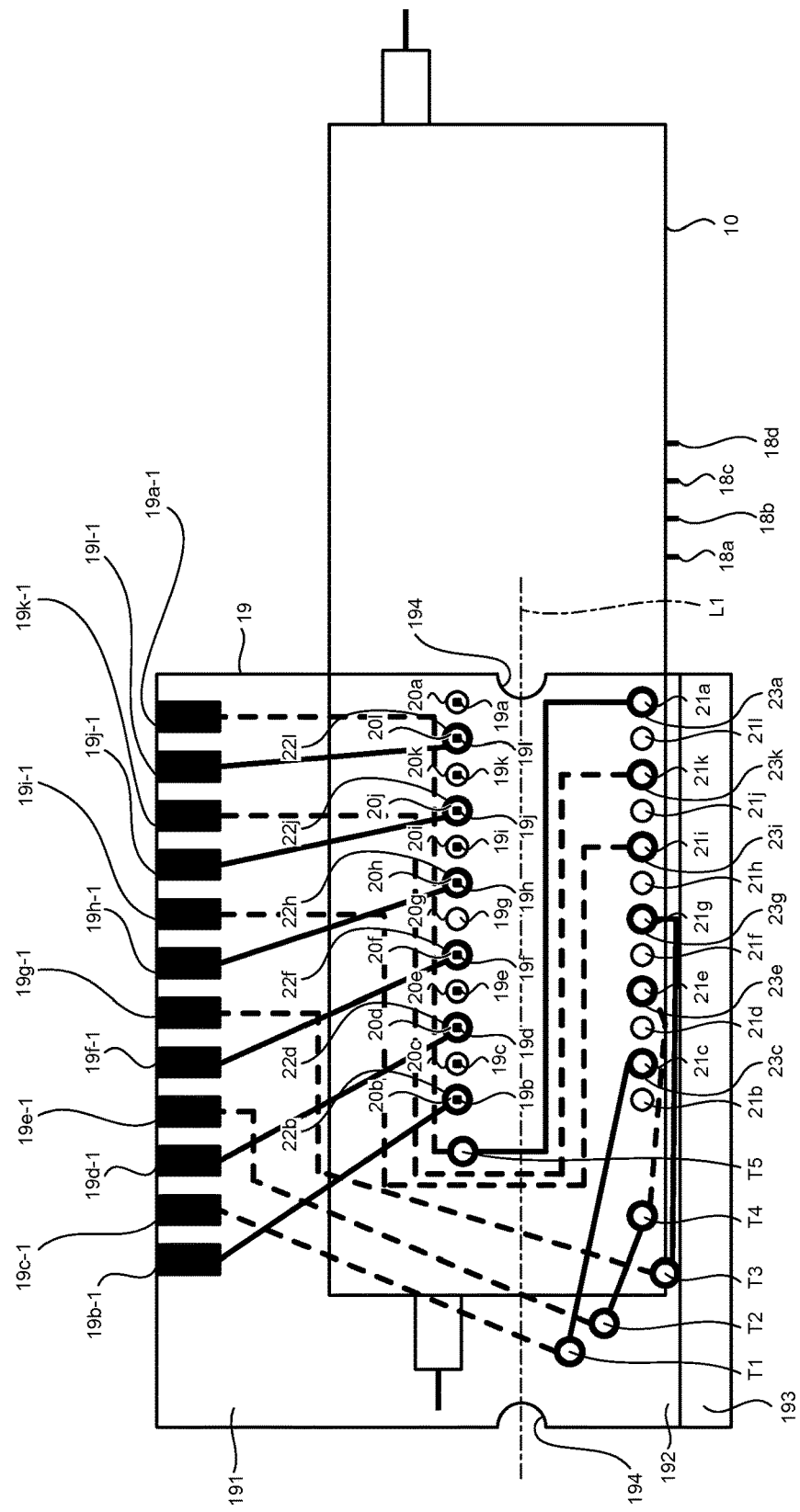
FIG. 4 is a side view illustrating the FPC in an unfolded state in the optical module according to a third modification example.

FIG. 4 is a side view illustrating the FPC 19 in an unfolded state in the optical module 10 according to the third modification example.

As illustrated in FIG. 4, the folded section of the FPC 19 has cut-out parts 194 formed therein. In the example illustrated in FIG. 4, the cut-out parts 194 are formed in such parts of the right and left end parts of the FPC 19 that intersect the fold start line L1. The folding position is determined thereby, so that the FPC 19 is easily folded along the fold start line L1.

[d] Fourth Modification Example

Next, a fourth modification example will be explained. An optical module according to the fourth modification example has the same configuration as that of the optical module 10 according to the embodiment described above, except for the shapes of the through holes formed in the FPC 19. Accordingly, in the description of the fourth modification example, some of the constituent elements that are the same as those in the embodiment described above will be referred to by using the same reference characters, and the detailed explanation thereof will be omitted.

FIG. 5A is a side view illustrating the FPC 19 in a folded state in the optical module 10 according to the fourth modification example. FIG. 5B is a side view illustrating the FPC 19 in an unfolded state in the optical module 10 according to the fourth modification example.

As illustrated in FIGS. 5A and 5B, among the first through holes 20*a* to 20*l*, one group of first through holes, namely, the first through holes 20*b*, 20*d*, 20*f*, 20*h*, 20*j*, and 20*l* have smaller diameters than the other group of first through holes, namely, the first through holes 20a, 20c, 20e, 20g, 20i, and 20k. Further, among the second through holes 21a to 21l, one group of second through holes, namely, the second through holes 21a, 21c, 21e, 21g, 21i, and 21k have smaller diameters than the other group of second through holes, namely, the second through holes 21b, 21d, 21f, 21h, 21j, and 21l. In other words, among the first through holes 20a to 20l and the second through holes 21a to 21l, the groups of first through holes and second through holes around which the land parts are formed have smaller diameter than the other groups of first through holes and second through holes around which no land parts are formed. With this arrangement, when the FPC 19 is installed in the package 11, the DC pins 19a to 19l are smoothly inserted through the first through holes 20a to 20l, and also when the FPC 19 is folded, the DC pins 19a to 19l are smoothly inserted through the second through holes 21a to 21l. As a result, it is possible to improve the workability without the need to enlarge the gap between the adjacently-positioned DC pins.

[e] Fifth Modification Example

Next, a fifth modification example will be explained. An optical module according to the fifth modification example has the same configuration as that of the optical module 10 according to the embodiment described above, except for the layout of the DC pins 19a to 19l. Accordingly, in the description of the fifth modification example, some of the constituent elements that are the same as those in the embodiment described above will be referred to by using the same reference characters, and the detailed explanation thereof will be omitted.

Figure 6A:
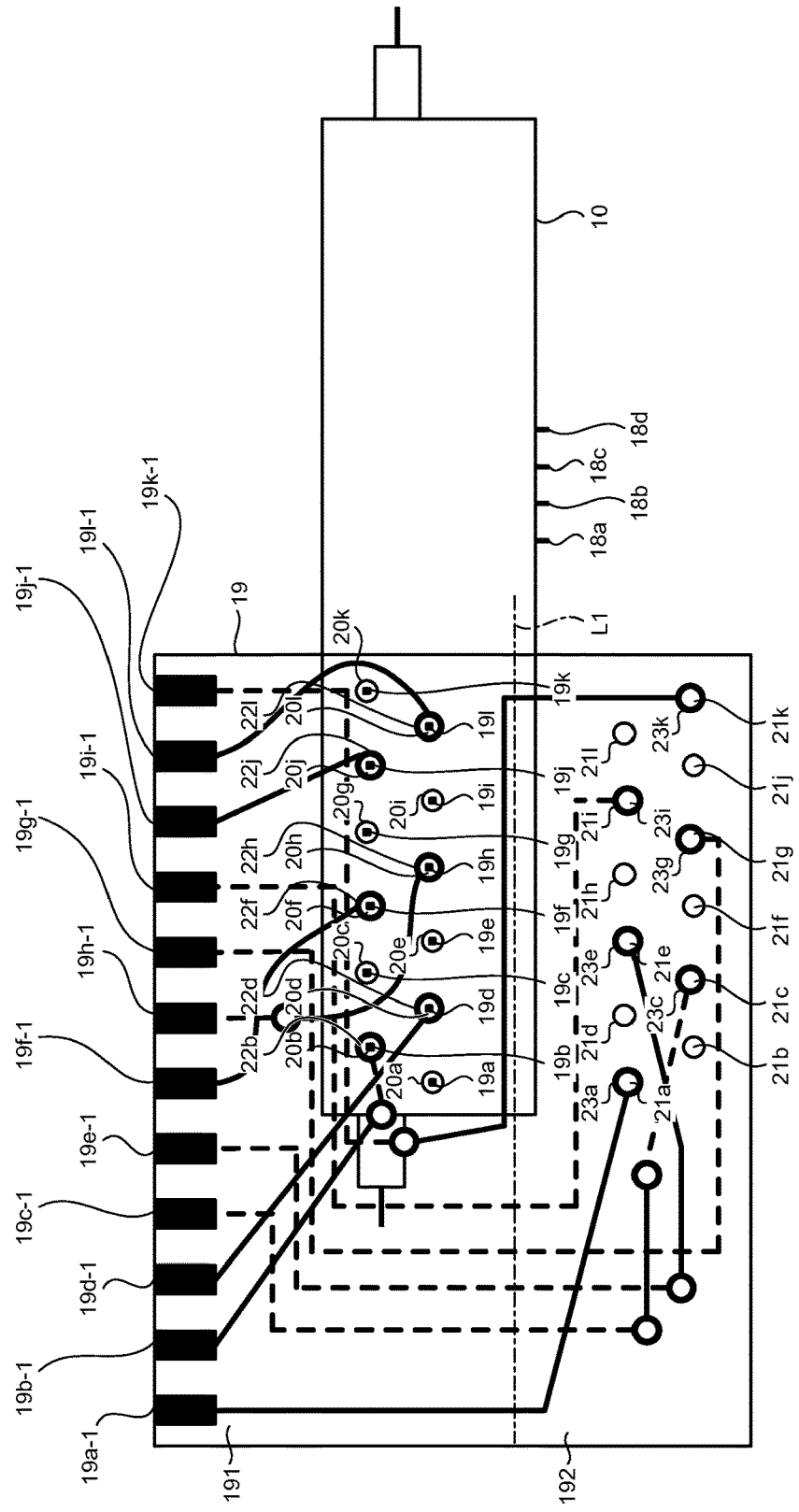
FIG. 6A is a side view illustrating the FPC in an unfolded state in the optical module according to a fifth modification example.
Figure 6B:
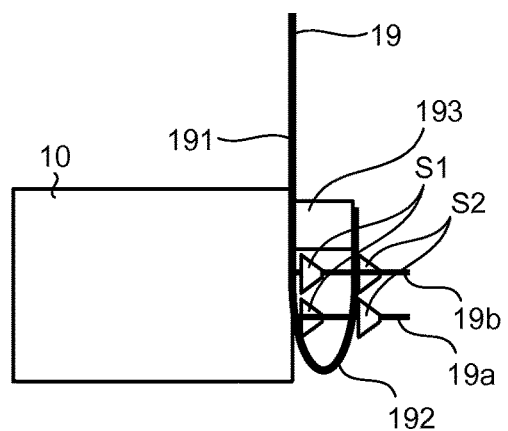
FIG. 6B is a front view illustrating the FPC in a folded state in the optical module according to the fifth modification example.

FIG. 6A is a side view illustrating the FPC 19 in an unfolded state in the optical module 10 according to the fifth modification example. FIG. 6B is a front view illustrating the FPC 19 in a folded state in the optical module 10 according to the fifth modification example.

As illustrated in FIGS. 6A and 6B, the twelve DC pins 19a to 19l are arranged in two rows in the FPC 19. In other words, the DC pins 19a, 19d, 19e, 19h, 19i, and 19l are arranged in the lower row, whereas the DC pins 19b, 19c, 19f, 19g, 19j, and 19k are arranged in the upper row.

The FPC 19 has the first planar part 191, the second planar part 192 that opposes the first planar part 191 as a result of the FPC 19 being folded, and the spacer 193. The first planar part 191 has formed therein the first through holes 20a to 20l into which the DC pins 19a to 19l are inserted, respectively. The second planar part 192 has formed therein the second through holes 21a to 21l into which the DC pins 19a to 19l that are inserted through the first through holes 20a to 20l are further inserted, respectively. The first through holes 20a to 20l are arranged in two rows in the first planar part 191, so that the DC pins 19a to 19l arranged in the two rows are inserted therein, respectively. The second through holes 21a to 21l are arranged in two rows in the second planar part 192, so that the DC pins 19a to 19l arranged in the two rows are inserted therein, respectively, while the first planar part 191 is opposing the second planar part 192 as a result of the FPC 19 being folded.

In the first planar part 191, the first land parts 22b, 22d, 22f, 22h, 22j, and 22l are formed around the selected ones of the first through holes 20a to 20l that are not positioned adjacent to each other, namely, the first through holes 20b, 20d, 20f, 20h, 20j, and 20l. The first land parts 22b, 22d, 22f, 22h, 22j, and 22l are connected to selected DC pins which are among the DC pins 19a to 19l arranged in the two rows and are inserted through the first through holes 20b, 20d, 20f, 20h, 20j, and 20l. More specifically, the first land parts 22b, 22d, 22f, 22h, 22j, and 22l are electrically connected to the DC pins 19b, 19d, 19f, 19h, 19j, and 19l, respectively, by the solder S1 (see FIG. 6B). As a result, the first land parts 22b, 22d, 22f, 22h, 22j, and 22l are inhibited from having short-circuits therebetween that may be caused by the solder. In addition, it is also possible to easily solder each of the DC pins to the corresponding one of the first land parts 22b, 22d, 22f, 22h, 22j, and 22l.

In the second planar part 192, the second land parts 23a, 23c, 23e, 23g, 23i, and 23k are formed around the selected ones of the second through holes 21a to 21l into which the other DC pins are inserted, namely, the second through holes 21a, 21c, 21e, 21g, 21i, and 21k. In this situation, the other pins are the DC pins 19a, 19c, 19e, 19g, 19i, and 19k, which are among the DC pins 19a to 19l arranged in the two rows and are not connected to the first land parts 22b, 22d, 22f, 22h, 22j, and 22l. The second land parts 23a, 23c, 23e, 23g, 23i, and 23k are connected to the other DC pins which are among the DC pins 19a to 19l arranged in the two rows and are inserted through the second through holes 21a, 21c, 21e, 21g, 21i, and 21k. More specifically, the second land parts 23a, 23c, 23e, 23g, 23i, and 23k are electrically connected to the DC pins 19a, 19c, 19e, 19g, 19i, and 19k by the solder S2 (see FIG. 6B). With these arrangements, the second land parts 23a, 23c, 23e, 23g, 23i, and 23k are inhibited from having short-circuits therebetween that may be caused by the solder. In addition, it is also possible to easily solder each of the DC pins to the corresponding one of the second land parts 23a, 23c, 23e, 23g, 23i, and 23k.

In the optical module 10 according to the fifth modification example above, the DC pins 19a to 19l are described as being arranged in the two rows (i.e., the upper row and the lower row) in the FPC 19. However, the number of rows is not limited to two. The DC pins 19a to 19l may be arranged in more than two rows. For example, let us discuss an example in which the DC pins 19a to 19l are arranged in as many rows as N (where N is an integer of 2 or larger). In that situation, the first through holes 20a to 20l are arranged in the first planar part 191 in as many rows as N, so that the DC pins 19a to 19l arranged in as many rows as N are inserted therein, respectively. The second through holes 21a to 21l are arranged in the second planar part 192 in as many rows as N, so that the DC pins 19a to 19l that are arranged in as many rows as N are inserted therein, respectively, while the second planar part 192 is opposing the first planar part 191 as a result of the FPC 19 being folded. The first land parts 22b, 22d, 22f, 22h, 22j, and 22l are connected to the selected DC pins which are among the DC pins 19a to 19l arranged in as many rows as N and are inserted through the selected first through holes 20b, 20d, 20f, 20h, 20j, and 20l. The second land parts 23a, 23c, 23e, 23g, 23i, and 23k are connected to the other DC pins which are among the DC pins 19a to 19l arranged in as many rows as N and are inserted through the second through holes 21a, 21c, 21e, 21g, 21i, and 21k. With these arrangements, even if the DC pins 19a to 19l are arranged in as many rows as N, it is possible to inhibit the occurrence of crosstalk between the DC signals flowing through any adjacently-positioned two of the DC pins 19a to 19l. In addition, it is also possible to improve the workability in the process of soldering the DC pins to the corresponding land parts.

[f] Sixth Modification Example

Next, a sixth modification example will be explained. An optical module according to the sixth modification example has the same configuration as that of the optical module 10 according to the embodiment described above, except that the FPC 19 is folded twice and except for configurations of the FPC 19 related to the double folding. Accordingly, in the description of the sixth modification example, some of the constituent elements that are the same as those in the embodiment described above will be referred to by using the same reference characters, and the detailed explanation thereof will be omitted.

Figure 7:
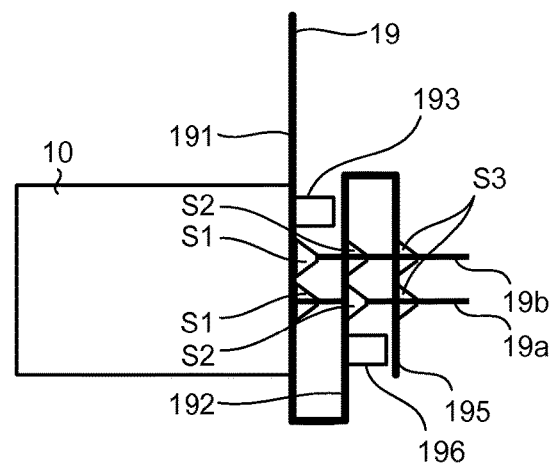
FIG. 7 is a front view illustrating the FPC in a folded state in the optical module according to a sixth modification example.

FIG. 7 is a front view illustrating the FPC 19 in a folded state in the optical module 10 according to the sixth modification example.

As illustrated in FIG. 7, during the manufacture of the optical module 10, the FPC 19 is folded twice. The FPC 19 has the first planar part 191, the second planar part 192 that opposes the first planar part 191 as a result of the FPC 19 being folded for the first time, and a third planar part 195 that opposes the second planar part 192 as a result of the FPC 19 being folded for the second time. Further, the FPC 19 includes the spacer 193 and a spacer 196. The first planar part 191 has formed therein the first through holes 20a to 20l into which the DC pins 19a to 19l are inserted, respectively. The second planar part 192 has formed therein the second through holes 21a to 21l into which the DC pins 19a to 19l that are inserted through the first through holes 20a to 20l are further inserted, respectively. The third planar part 195 has formed therein third through holes (not illustrated) into which the DC pins 19a to 19l that are inserted through the second through holes 21a to 21l are further inserted, respectively.

On the first planar part 191, at least one first land part is formed around selected ones of the first through holes 20a to 20l that are not positioned adjacent to each other. The first land part is connected to a selected one of the DC pins 19a to 19l that is inserted through the first through hole, namely, the DC pin 19b. More specifically, the first land part is electrically connected to the selected DC pin 19b by the solder S1 (see FIG. 7). With this arrangement, the first land parts are inhibited from having short-circuits therebetween that may be caused by the solder. In addition, it is also possible to easily solder the DC pins to the corresponding first land parts.

On the second planar part 192, at least one second land part is formed around a selected one of the second through holes 21a to 21l into which another one of the DC pins is inserted. In this situation, "another one of the DC pins" noted above is the DC pin 19a, which is among the DC pins 19a to 19l and is not connected to the first land part. The second land part is connected to said another DC pin 19a, which is among the DC pins 19a to 19l and is inserted through the selected one of the second through holes. More specifically, the second land part is electrically connected to said another DC pin 19a by the solder S2 (see FIG. 7). With these arrangements, the second land parts are inhibited from having short-circuits therebetween that may be caused by the solder. In addition, it is also possible to easily solder the DC pins to the corresponding second land parts.

On the third planar part 195, at least one third land part is formed around a selected one of the third through holes into which yet another one of the DC pins is inserted. In this situation, "yet another one of the DC pins" is one of the DC pins 19a to 19l that is connected to neither the first land part nor the second land part. The third land part is connected to said yet another DC pin, which is among the DC pins 19a to 19l and is inserted through the selected one of the third through holes. More specifically, the third land part is electrically connected to said yet another DC pin by solder S3 (see FIG. 7). With these arrangements, the third land parts are inhibited from having short-circuits therebetween that may be caused by the solder. In addition, it is also possible to easily solder the DC pins to the corresponding third land parts.

The spacer 193 is interposed between the first planar part 191 and the second planar part 192, while the second planar part 192 is opposing the first planar part 19l as a result of the FPC 19 being folded for the first time. The spacer 196 is interposed between the second planar part 192 and the third planar part 195, while the third planar part 195 is opposing the second planar part 192 as a result of the FPC 19 being folded for the second time. During the manufacture of the optical module 10, the FPC 19 is folded twice. When being folded for the first time, the FPC 19 is folded in such a manner that the first planar part 191 and the second planar part 192 are positioned apart from each other by a distance corresponding to the thickness of the spacer 193. Further, when being folded for the second time, the FPC 19 is folded in such a manner that the second planar part 192 and the third planar part 195 are positioned apart from each other by a distance corresponding to the thickness of the spacer 196. Accordingly, the stress applied to the folded sections of the FPC 19 is smaller than in the situation where the spacers 193 and 196 are not interposed. As a result, it is possible to lower the possibility that the wirings connecting the second land parts to the DC electrodes and the wirings connecting the third land parts to the DC electrodes may be broken by the stress from folding the FPC 19.

In the optical module 10 according to the sixth modification example described above, the FPC 19 is described as being folded twice. However, the number of times the FPC 19 is folded does not necessarily have to be two. The FPC 19 may be folded more than two times. For example, let us discuss an example in which the FPC 19 is folded as many times as M (where M is an integer of 2 or larger). In that situation, the FPC 19 has an (M+1)th planar part that opposes the planar part positioned underneath thereof as a result of the FPC 19 being folded for the M'th time and that has formed therein a plurality of (M+1)th through holes into each of which a different one of the DC pins 19a to 19l are inserted. Further, on the (M+1)th planar part, (M+1)th land parts are formed around selected (M+1)th through holes which are among the plurality of (M+1)th through holes and into which such terminals that are not connected to any of the land parts formed on the planar part positioned underneath thereof are inserted. The (M+1)th land parts are connected to the terminals inserted through the selected (M+1)th through holes.

[g] Application Examples

Figure 8:
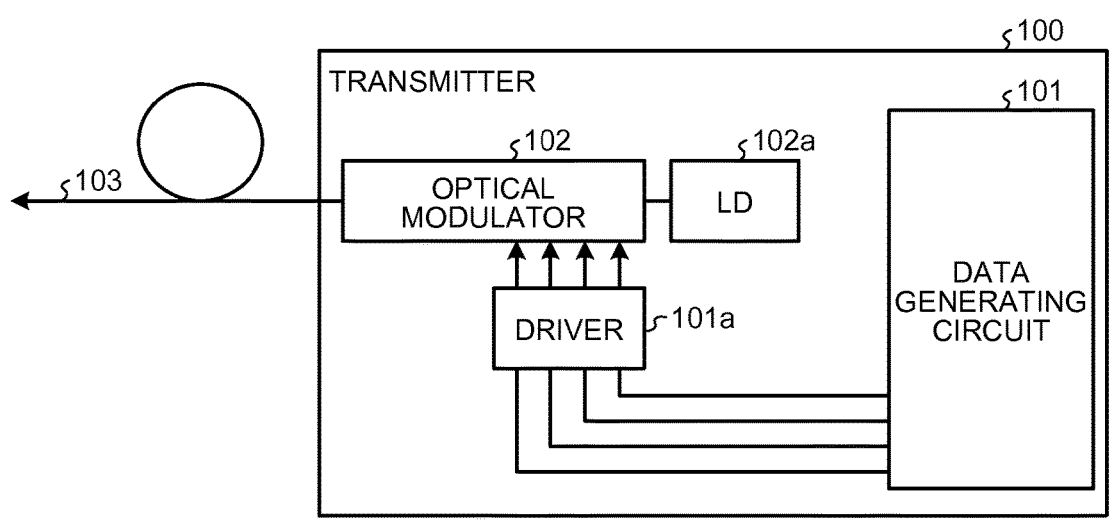
FIG. 8 is a diagram illustrating a configuration of a transmitter having installed therein the optical module according to the present embodiment or any of the modification examples.

An optical modulator employing the optical module 10 described above is able to achieve both high reliability and high mountability. Thus, applying the optical modulator to a transmitter is effective. FIG. 8 is a diagram illustrating a configuration of a transmitter 100 having installed therein the optical module 10 according to the embodiment described above or any of the modification examples. As illustrated in FIG. 8, the transmitter 100 includes a data generating circuit 101, an optical modulator 102, and an optical fiber 103. Further, the data generating circuit 101 includes a driver 101a. The optical modulator 102 includes a Laser Diode (LD) 102a. These constituent elements are connected in such a manner that various types of signals and data can be input thereto and output therefrom in either one direction or two directions. Data generated by the data generating circuit 101 is converted from an electrical signal into an optical signal by the optical modulator 102, before being transmitted to the outside of the apparatus via the optical fiber 103 serving as a transfer medium.

In particular, it is effective to apply the optical module 10 to an optical modulator in which it is possible to connect DC pins to a large number of DC electrodes by using the FPC 19. Examples of such an optical modulator include an In-phase/Quadrature (I/Q) optical modulator, a polarization multiplex optical modulator, an Integrated Dual Polarization Quadrature Modulated Transmitter Assembly (ITXA), an Integrated Coherent Receiver (ICR), an optical transmitter-and-receiver-in-one device. The optical module 10 does not necessarily have to be applied to a transmitter and may be applied to a receiver.

In the description above, the individual configurations and operations are explained for each of the embodiments and the modification examples. However, the optical module 10 according to any of the embodiments and the modification examples described above may also include any of the constituent elements that are unique to any other modification example. Further, it is possible to combine together, not only two of the embodiments and the modification examples, but also in any arbitrary form such as combining three or more of the embodiments and the modification examples together. For instance, the optical module 10 described in the above embodiment may be configured so that the FPC 19 has the cut-out parts 194 described in the third modification example. Further, the single optical module 10 may include all of the constituent elements in the embodiments and the first to the sixth modification examples described above, as long as no conflict arises among the constituent elements.

According to at least one aspect of the embodiments of the optical module disclosed herein, an advantageous effect is achieved it is possible to improve the workability in the soldering process, while inhibiting the occurrence of crosstalk.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising a substrate and a plurality of terminals, wherein
the substrate includes:
a first planar part having a plurality of first through holes into which the plurality of terminals are inserted respectively;
a second planar part that opposes the first planar part as a result of the substrate being folded and that has, on positions opposing the plurality of first through holes as the result of the substrate being folded, a plurality of second through holes into which the plurality of terminals inserted into the plurality of first through holes respectively are inserted respectively;
a first land part that is formed on the first planar part around at least one of the plurality of first through holes and that is connected to at least one of the plurality of terminals inserted into the at least one of the plurality of first through holes; and
a second land part that is formed on the second planar part around at least one of the plurality of second through holes into which another one of the plurality of terminals not being connected to the first land part is inserted and that is connected to the other one of the plurality of terminals inserted into the at least one of the plurality of second through holes.

2. The optical module according to claim 1, further comprising a spacer interposed between the first planar part and the second planar part, with the second planar part opposed to the first planar part as a result of the substrate being folded.

3. The optical module according to claim 1, wherein the substrate further includes a wiring that extends from the second land part and is formed so as to detour a terminal that is arranged in an outermost position from among the plurality of terminals respectively inserted into the plurality of first through holes.

4. The optical module according to claim 3, wherein the wiring is formed so as to run on a front surface and a rear surface of the substrate alternately.

5. The optical module according to claim 4, comprising a plurality of the wirings, wherein only wirings that are not positioned adjacent to each other from among the plurality of the wirings are formed from the rear surface of the substrate.

6. The optical module according to claim 1, wherein the at least one of the plurality of first through holes has a smaller diameter than another first through hole other than the at least one of the plurality of first through holes, and
the at least one of the plurality of second through holes has a smaller diameter than another second through hole other than the at least one of the plurality of second through holes.

7. The optical module according to claim 1, wherein a folded section of the substrate has at least one cut-out part.

8. The optical module according to claim 1, wherein
the plurality of terminals are arranged in N rows, where N is an integer of 2 or larger,
the plurality of first through holes are arranged in the first planar part in N rows, the plurality of terminals arranged in N rows being inserted into the plurality of first through holes,
the plurality of second through holes are arranged in the second planar part in N rows, the plurality of terminals arranged in N rows being inserted into the plurality of second through holes with the second planar part opposed to the first planar part as a result of the substrate being folded,
the first land part is connected to the at least one of the plurality of terminals which is, among the plurality of terminals arranged in N rows, inserted into the at least one of the first through holes, and
the second land part is connected to the other one of the plurality of terminals which is, among the plurality of terminals arranged in N rows, inserted into the at least one of the second through holes.

9. The optical module according to claim 1, wherein
the substrate is folded M times, where M is an integer of 2 or larger, and
the substrate further includes:
an (M+1)th planar part that opposes a planar part positioned underneath thereof as a result of the substrate being folded for an M'th time and that has a plurality of (M+1)th through holes into which the plurality of terminals are inserted respectively; and
an (M+1)th land part that is formed on the (M+1)th planar part around at least one of the plurality of (M+1)th through holes into which another one of the plurality of terminals not being connected to any land parts formed on the planar part is inserted, the (M+1)th land part being connected to the other one of the plurality of terminals inserted into the at least one of the plurality of (M+1)th through holes.

* * * * *